Figure 1:
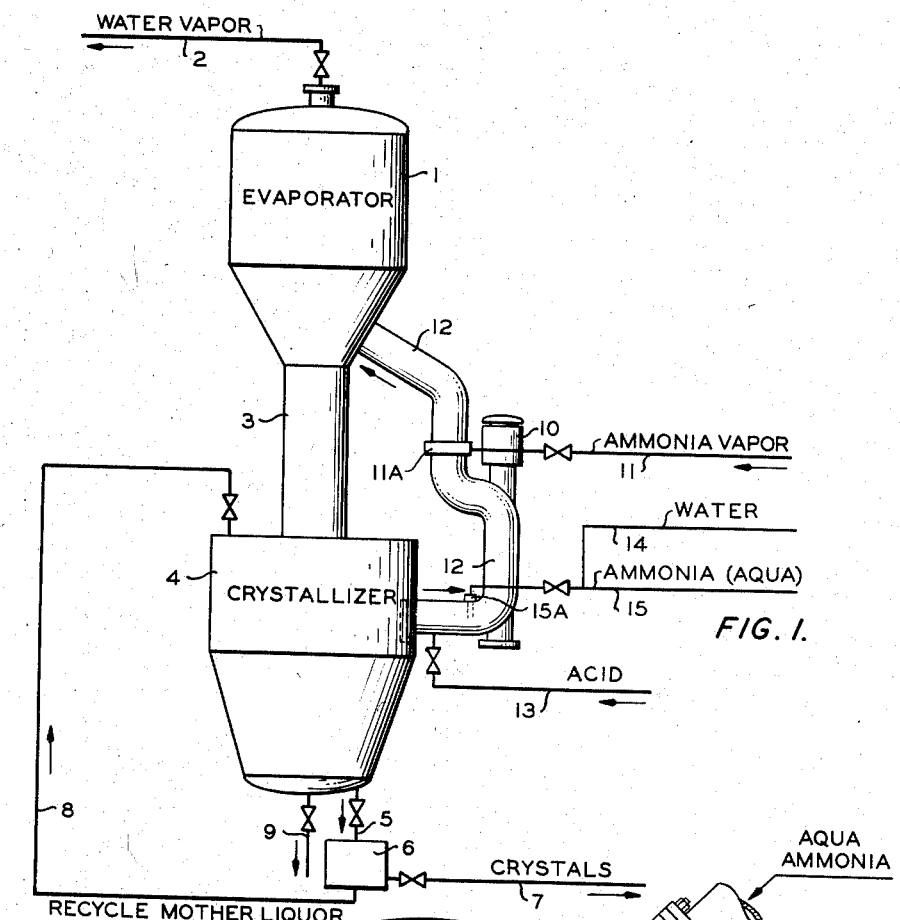

June 16, 1959 N. E. LLOYD 2,890,935
METHOD OF MINIMIZING WATER HAMMER IN EVAPORATIVE
CRYSTALLIZATION PROCESSES
Filed Jan. 3, 1956

INVENTOR.
NEIL E. LLOYD
BY
Hudson & Young
ATTORNEYS

United States Patent Office 2,890,935
Patented June 16, 1959

2,890,935

METHOD OF MINIMIZING WATER HAMMER IN EVAPORATIVE CRYSTALLIZATION PROCESSES

Neil E. Lloyd, Rock Hill, S.C., assignor to Phillips Petroleum Company, a corporation of Delaware Application January 3, 1956, Serial No. 556,854

6 Claims. (Cl. 23—119)

This invention relates to methods and apparatus for mixing liquids. In one aspect the invention relates to methods and apparatus for production of ammonium sulfate. In another aspect the invention relates to method and apparatus for mixing aqua ammonia with an aqueous medium containing sulfuric acid. In still another aspect the invention relates to methods and apparatus, for injecting aqua ammonia into a hot, flowing aqueous stream containing free sulfuric acid, involving preliminary rapid injector mixing of a high velocity stream of aqua ammonia into a confined zone with a stream of a portion of the hot acid stream, and discharging the resulting mixed stream into main flowing stream of hot sulfuric acid.

In the production of ammonium sulfate the hot magma, composed of ammonium sulfate crystals and ammonium sulfate dissolved in water, is pumped from the crystallizer up into the evaporator. As the magma stream passes from the crystallizer to the evaporator, sulfuric acid is added in one place and anhydrous ammonia and/or aqua ammonia are also added to the magma as it passes to the evaporator. The solution of the ammonia and the sulfuric acid in the magma is an exothermic reaction as is the reaction of the ammonia and the sulfuric acid to form ammonium sulfate. This exothermic heat considerably increases the temperature of the magma. The high temperature magma passes into the evaporator which operates under vacuum. Water is evaporated and removed from the magma thereby concentrating it. The sensible heat of the magma is reduced as a result of the evaporation and therefore the temperature of the magma is reduced. The magma flows from the evaporator down into the crystallizer where ammonium sulfate crystals grow in size. A continuous stream of magma is withdrawn from the bottom of the crystallizer and pumped to the centrifuge. At the centrifuge the mother liquor is separated from the magma and then pumped back to the crystallizer. The crystals separated from the magma are discharged to a belt feeding the product dryers.

When the aqua ammonia is added, by conventional means, to the hot magma containing free acid as it is pumped to the evaporator, considerable water hammering results. The hammer effect is caused by slugs of concentrated, unmixed, sulfuric acid reacting with slugs of unmixed aqua ammonia. When using aqua ammonia of about 30 to 40 percent concentration, the water hammer is so violent that it is very hard on the human nervous system and rapidly wears out the equipment. By practice of this invention methods and apparatus are provided which reduce the water hammering.

It is an object of this invention to provide a method for introduction and mixing of aqua ammonia into a hot flowing aqueous stream containing free sulfuric acid in a manner such that equipment subject to wear from the objectionable water hammering is minimized. It is another object of this invention to provide an arrangement of apparatus to accomplish this purpose.

According to the invention there is provided a method which comprises injecting a high velocity aqua ammonia stream into concurrent flow with a confined aqueous stream, of larger cross-sectional area than said aqua ammonia stream, containing free sulfuric acid, the velocity of flow of the aqua ammonia stream being such that the aqua ammonia stream flow induces lateral flow of aqueous sulfuric acid from a hot flowing stream of aqueous sulfuric acid surrounding said confined aqueous stream containing free sulfuric acid into confluence with said confined aqueous stream containing sulfuric acid, and flowing the resultant combined stream into the said surrounding hot flowing stream of aqueous sulfuric acid. In one particular application of the invention the said aqueous sulfuric acid contains ammonium sulfate crystals and dissolved ammonium sulfate. The seriousness of the water hammer problem is intensified by the presence of the crystalline ammonium sulfate which causes very great erosive wear of equipment when there is water hammer.

It is known in the art to circulate a confined flowing stream of aqueous liquid from and to a very large body of such aqueous liquid and to introduce liquefied anhydrous ammonia directly into the confined stream, while avoiding any great increase in temperature of the large body of liquid by cooling of the body of liquid. In the present process, however, the flowing magma containing free sulfuric acid, into which the aqua ammonia is injected, is already hot and on admixture with aqua ammonia develops a great deal more heat through exothermic solution and exothermic chemical reaction. These factors all combine in a flowing stream to produce a very serious water hammer problem. Cooling can not be restorted to for minimizing the problem since the high temperature of the resulting combined flowing stream is needed to provide heat necessary for evaporation of water from the combined stream after it flows downstream into the evaporator.

These problems, and the invention, will be more clearly understood by reference to a diagrammatic flow sheet of an evaporative crystallization process for the production of crystalline ammonium sulfate, as shown in Figure 1.

Referring now to Figure 1, 1 is an evaporator operated at reduced pressure for removing water from a solution of ammonium sulfate. Line 2 is the outlet for the vapor from the evaporator. A sufficient vacuum is maintained on the evaporator at all times to make the solution therein boil. The supersaturated solution passes from the evaporator through barometric leg 3 to crystallizer 4. The solution from the evaporator which is supersaturated contacts crystals in the crystallizer causing them to grow. In this manner, the supersaturation of the solution is relieved. A crystal slurry or magma from crystallizer 4 is removed via line 5 and is passed therethrough to centrifuge 6 where the crystals are separated from the mother liquor. The crystals are recovered from this apparatus via line 7 and the mother liquor is recycled therefrom via line 8 back into the top of the crystallizer. Line 9 is provided in the center of the bottom of the crystallizer to provide complete drainage when necessary. A certain degree of separation of crystals from mother liquor is obtained within the crystallizer itself because of the weight of the crystals. The crystals are caused to settle out toward the bottom of the crystallizer and thus a solution containing less crystals will remain in the top of the crystallizer. This solution is pumped by means of pump 10 through conduit 12 back to the saturator, i.e., evaporator 1. Line 11 is provided for the introduction of ammonia vapor to the ammonia vapor sparger, 11A. Line 13 is provided for introducing continuously, additional acid to the solution going to the evaporator. Line 14 is for the introduction of water used for scrubbing ammonia from gases to the aqua ammonia addition line 15 and sparger 15A, said aqua ammonia reacting with acid introduced via line 13 to form more ammonium sulfate and making the process continuous.

When operating this apparatus for the manufacture of ammonium sulfate, the evaporator is preferably operated at a subatmospheric pressure in the range of 20 to 28 inches of mercury vacuum. Under this pressure the operating temperature will usually vary within the range of 125 to 160° F. and preferably within 140 to 150° F. Thus, the temperature of the magma, which is, say, 145° F. as it enters conduit 12, is raised even further by the exothermic heat of solution of the sulfuric acid introduced through line 13 into the magma, and is even further raised by the exothermic heat of solution of the anhydrous ammonia introduced through line 11 and by the exothermic reaction of ammonia with part of the free sulfuric acid. Thus, at the point where the aqua ammonia is introduced through sparger 15A, according to the invention, the conditions are very conducive to the setting up of a very serious water hammering. The circulating acidic magma stream is hot and in addition still contains slugs of unmixed strong sulfuric acid which can cause violent localized reaction of sulfuric acid with the aqua ammonia unless very efficient rapid mixing of the aqua ammonia with the hot flowing acidic magma stream can be effected. According to prior art procedures, a sparger tube consisting of a pipe, blinded off at the end, and containing a plurality of small holes along its length and around its circumference, has been employed. While this type of sparger has been found to be an improvement over an open-ended pipe, it is unsatisfactory under the severe conditions above described. Not only is excessive water hammer encountered but also the small holes tend to become plugged with ammonium sulfate, and since these crystals are completely insoluble in the concentrations of aqua ammonia usually employed, they are not removed by dissolving action of introduced aqua ammonia.

Figure 2:
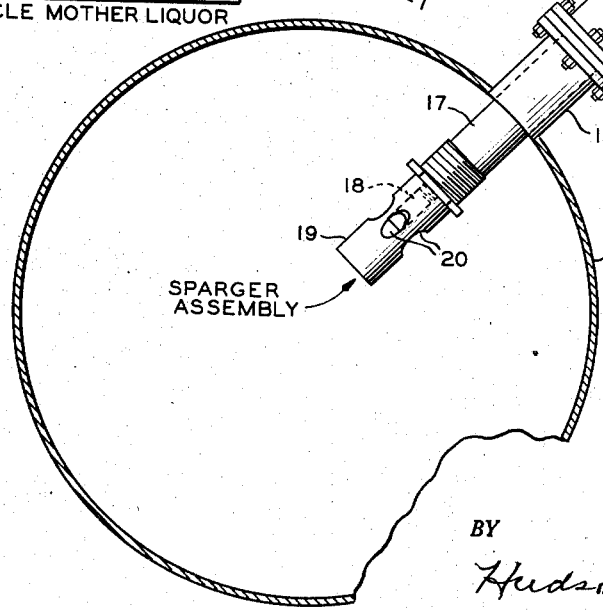

According to the present invention the rapid mixing of the aqua ammonia and the hot aqueous acid stream is effected by means of a sparger in the form of an ejector type mixer, one form of which is shown in Figure 2.

Refer now to Figure 2. Figure 2 is a cross section of conduit 12 of Figure 1 into which extends a 1½-inch sparger nozzle 15A transverse to the longitudinal axis of conduit 12. The sparger itself is made of a 1-inch pipe 17 which is swedged down to a ⅜-inch pipe 18. The extension 19 (made from a 1-inch pipe) around the ⅜-inch pipe extends about 6 inches past the end of the ⅜-inch pipe. Holes 20 are drilled in the extension near the end of the ⅜-inch pipe. In this particular apparatus holes 20 are ⅝ inch in diameter, but in any case they are large enough to allow free passage of any crystals in the magma. Aqua ammonia is pumped at a high velocity into the 1-inch pipe and flows into the ⅜-inch pipe, out through the end of the ⅜-inch pipe and then at high velocity out through the extension. Hot magma containing free sulfuric acid is drawn into the extension 19 by a venturi effect through the holes 20. The magma and aqua ammonia are rapidly mixed during their flow through extension 19. By means of this type mixing, water hammer is effectively minimized or eliminated, and wear on equipment is greatly reduced.

The sparger shown in Figure 2 is one form of ejector mixer which can be employed according to the invention. However, the end of pipe 18 can be in the form of a nozzle or can contain an orifice; and the extension 19 can be in the form of a converging or diverging nozzle or in the form of a venturi. In any case the openings 20 or their equivalent are necessary, and the aqua ammonia is discharged from extension 18 at a sufficiently high velocity to cause pumping of magma into extension 19 through holes 20 and consequent turbulent mixing downstream in extension 19 with the aqua ammonia.

In the process described in discussing Figure 2 the addition of part of the ammonia as substantially anhydrous vapor is desirable in order to supply added heat to the system for the evaporation of the water. A substantially constant flow of aqua ammonia is introduced through line 15 and comprises about 40 to about 80 percent of the total ammonia added while the remainder of the necessary ammonia is added through line 11 as substantially anhydrous vapor. Usually about half the ammonia is added through line 15 and about half through line 11. The total amount of ammonia added is preferably a little less than that required to neutralize the sulfuric acid, thus leaving about 0.5 percent free sulfuric acid, or a pH of about 2 to 3. We now prefer to maintain the rate of flow of sulfuric acid and ammonia vapor constant, and to control the flow of aqua ammonia by a pH controller (not shown) measuring the pH in vessel 4 which controls a rate of flow controller (not shown) which controls the flow of aqua ammonia.

The concentration of ammonia in the aqua ammonia is generally in the range from about 20 to 45 percent, preferably from 30 to 40 weight percent, still more preferably from 34 to 38 weight percent.

*Specific example*

In the process described in Figures 1 and 2, 10.5 g.p.m. of 98 percent sulfuric acid are added through line 13, 27.75 lbs. per minute of anhydrous ammonia are added through line 11, and 13 g.p.m. of 35 percent aqua ammonia are added through line 15 and sparger 15A. Pump 10 circulates magma at the rate of 9000 g.p.m. Production of ammonium sulfate crystals at the rate of 211 lbs. per minute is taken through line 7. Mother liquor from centrifuge 8 is recycled to crystallizer 4 at the rate of 1 g.p.m. Temperatures in evaporator 1 and crystallizer 4 are maintained at about 150° F. About 150 lbs. per minute of water vapor are removed through line 2. Vacuum is maintained at about 25 inches Hg and in crystallizer 4 at about 0 inch Hg. There is substantially no water hammer from the introduction of aqua ammonia through sparger 15A into conduit 12.

The apparatus of Figures 1 and 2 are constructed of corrosion resistant materials such as, for example, low carbon stainless steel.

In accordance with this invention, as hot ammonium sulfate magma, to which has been added sulfuric acid, flows in a stream from the crystallizer up to the water evaporation zone, the entire amount of ammonia needed can be added as either substantially anhydrous ammonia or in the form of aqua ammonia according to the process of my invention through the ejector mixer in order to minimize water hammer, or both anhydrous ammonia and aqua ammonia can be added according to my process, each through such an ejector mixer. Thus, in the process shown in the flow sheet of Figure 1, there is a pronounced water hammer problem associated with the addition of ammonia vapor through line 11 unless an effective sparging means is used for the introduction of the ammonia vapor. The sparger of Figure 2 is effective and useful in this service as well as for the addition of aqua ammonia into line 12.

The invention is applicable not only to ammonium sulfate production, but also the production of other crystalline materials by an evaporative crystallization process wherein the evaporator or saturator is at a higher level and separate from the crystallizer, and wherein a magma stream from the crystallizing zone, which is hot and contains added thereto a first reactant, is conducted upwardly to the evaporation zone, and in which process a second reactant stream, containing volatile or highly reactive materials is injected into the first stream during its transit from the lower crystallization zone to the higher evaporation zone, and wherein the conditions for setting up excessive water hammer exist absent an effective injection means. Thus, in such a process the second reactant stream can be injected according to the process and apparatus of my invention.

The invention is also applicable for mixing any liquid with a second liquid. It is valuable when mixing one liquid with a second liquid when an exothermic reaction occurs as a result of the two liquids reacting. The second liquid may or may not contain crystals. The invention may be used for the production of ammonium acid phosphate, ammonium nitrate, sodium phosphate, potassium phosphate and many other compounds.

As will be evident to those skilled in the art, various modifications of this invention can be made or followed in the light of the foregoing disclosure and discussion without departing from the spirit or scope of the disclosure or from the scope of the claims.

I claim:

1. In a process for production of ammonium sulfate by evaporative crystallization which comprises crystallizing ammonium sulfate from a hot ammonium sulfate magma in a crystallizing zone, separating part of the crystals from the magma and recovering said separated crystals, flowing a portion of the hot magma from the crystallizing zone as a first hot magma stream to a water evaporation zone, adding sulfuric acid into said first stream at a first point, adding ammonia vapor into said first stream at a second point downstream from said first point, and adding a stream of aqua ammonia into said first stream at a third point downstream from said second point, the improvement which comprises introducing said stream of aqua ammonia into said first flowing hot magma stream by injecting a high velocity aqua ammonia stream into concurrent flow with a confined second stream of hot magma, the velocity of flow of said aqua ammonia stream being such that it induces flow from said first hot magma stream into confluence with said second confined stream of hot magma, and discharging a resultant combined stream into said first flowing hot magma stream, said first magma stream being out of contact with, but surrounding, said confined second stream of hot magma, except for the contact occurring at the point of initial confluence.

2. In a process for production of ammonium sulfate by evaporative crystallization which comprises crystallizing ammonium sulfate from a hot ammonium sulfate magma in a crystallizing zone, separating part of the crystals from the magma and recovering said separated crystals, flowing a portion of the hot magma from the crystallizing zone as a first hot magma stream to a water evaporation zone, adding sulfuric acid into said first stream at a first point, and adding a stream of ammonia into said first stream at a second point downstream from said first point, the improvement which comprises introducing said first stream of ammonia into said first flowing hot magma stream by injecting a high velocity ammonia stream into concurrent flow with a confined second stream of hot magma, the velocity of flow of said ammonia stream being such that it induces flow from said first hot magma stream into confluence with said second confined stream of hot magma, and discharging a resultant combined stream into said first flowing hot magma stream, said first magma stream being out of contact with, but surrounding, said confined second stream of hot magma, except for the contact occurring at the point of initial confluence.

3. In a process for production of ammonium sulfate by evaporative crystallization which comprises crystallizing ammonium sulfate from a hot ammonium sulfate magma in a crystallizing zone, separating part of the crystals from the magma and recovering said separated crystals, flowing a portion of the hot magma from the crystallizing zone as a first hot magma stream to a water evaporation zone, adding sulfuric acid into said first stream at a first point, and adding a stream of aqua ammonia into said first stream at a second point downstream from said first point, the improvement which comprises introducing said stream of aqua ammonia into said first flowing hot magma stream by injecting a high velocity aqua ammonia stream into concurrent flow with a confined second stream of hot magma, the velocity of flow of said aqua ammonia stream being such that it induces flow from said first hot magma stream into confluence with said second confined stream of hot magma, and discharging a resultant combined stream into said first flowing hot magma stream, said first magma stream being out of contact with, but surrounding, said confined second stream of hot magma, except for the contact occurring at the point of initial confluence.

4. In a process for production of ammonium sulfate by evaporative crystallization which comprises crystallizing ammonium sulfate from a hot ammonium sulfate magma in a crystallizing zone, separating part of the crystals from the magma and recovering said separated crystals, flowing a portion of the hot magma from the crystallizing zone as a first hot magma stream upwardly to a water evaporation zone, adding a stream of sulfuric acid into said first stream at a first point, adding a stream of ammonia into said first stream at a second point downstream from said first point, discharging said first hot magma stream into said water evaporation zone below the level of liquid in said zone, evaporating water in said zone and removing water from said zone, thereby concentrating the magma in said zone, and separately flowing the resulting magma from said water evaporation zone down to said crystallizing zone, the improvement which comprises introducing said stream of ammonia into said first flowing hot magma stream by injecting a high velocity ammonia stream into concurrent flow with a confined second stream of hot magma, the velocity of flow of said ammonia stream being such that it induces flow from said first hot magma stream into confluence with said second confined stream of hot magma, and discharging a resultant combined stream into said first flowing hot magma stream, said first magma stream being out of contact with, but surrounding, said confined second stream of hot magma, except for the contact occurring at the point of initial confluence, thus intimately admixing the said second confined hot magma stream and the said ammonia stream under highly turbulent conditions in order to minimize water hammer due to the introduction of said ammonia stream.

5. In a process for production of a crystalline reaction product by evaporative crystallization which comprises crystallizing said product from a hot magma of said product in a crystallizing zone, separating part of the crystals from the magma and recovering said separated crystals, flowing a portion of the hot magma from the crystallizing zone as a first hot magma stream upwardly to a water evaporation zone, adding a stream of a first reactant into said first stream at a first point, adding a stream of a second reactant into said first stream of hot magma at a second point downstream from said first point, discharging said first hot magma stream into said water evaporation zone below the level of liquid in said zone, evaporating water in said zone and removing water from said zone, thereby concentrating magma in said zone, and separately flowing the resulting magma from said water evaporation zone down to said crystallizing zone, the improvement which comprises introducing said stream of second reactant into said first stream of hot magma by injecting said second reactant as a high velocity stream into concurrent flow with a confined second stream of hot magma, the velocity of flow of said second reactant stream being such that it induces flow from said first hot magma stream into confluence with said confined second stream of hot magma, and discharging a resultant combined stream into said first flowing hot magma stream, said first magma stream being out of contact with, but surrounding, said confined second stream of hot magma, except for the contact occurring at the point of initial confluence, thus intimately admixing the said confined second stream of hot magma and the said stream of second reactant under highly turbulent conditions in order to minimize water hammer due to the introduction of said second reactant stream.

6. In a process for production of ammonium sulfate by evaporative crystallization which comprises crystallizing ammonium sulfate from a hot ammonium sulfate magma in a crystallizing zone, separating part of the crystals from the magma and recovering said separated crystals, flowing a portion of the hot magma from the crystallizing zone as a first hot magma stream to a water evaporation zone, adding sulfuric acid into said first stream at a first point, adding a stream of aqua ammonia into said first stream at a second point downstream from said first point, and adding anhydrous ammonia into said first stream at a third point downstream from said second point, the improvement which comprises introducing said stream of aqua ammonia into said first flowing hot magma stream by injecting a high velocity aqua ammonia stream into concurrent flow with a confined second stream of hot magma, the velocity of flow of said aqua ammonia stream being such that it induces flow from said first hot magma stream into confluence with said second confined stream of hot magma, and discharging a resultant combined stream into said first flowing hot magma stream, said first magma stream being out of contact with, but surrounding, said confined second stream of hot magma, except for the contact occurring at the point of initial confluence.

References Cited in the file of this patent
UNITED STATES PATENTS

| | | |
|---|---|---|
| 1,098,811 | Loebel et al. | June 2, 1914 |
| 1,885,012 | Harvey | Oct. 25, 1932 |
| 2,415,650 | McKee | Feb. 11, 1947 |
| 2,671,652 | McCullough | Mar. 9, 1954 |